(12) United States Patent
Murakami

(10) Patent No.: US 12,140,212 B2
(45) Date of Patent: Nov. 12, 2024

(54) ROTATING SHAFT STRUCTURE COMPRISING PLURALITY OF SPEED REDUCERS, AND MANUFACTURING METHOD THEREFOR

(71) Applicant: FANUC CORPORATION, Yamanashi (JP)

(72) Inventor: Wataru Murakami, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 63 days.

(21) Appl. No.: 17/918,601

(22) PCT Filed: May 17, 2021

(86) PCT No.: PCT/JP2021/018656
§ 371 (c)(1),
(2) Date: Oct. 13, 2022

(87) PCT Pub. No.: WO2021/235399
PCT Pub. Date: Nov. 25, 2021

(65) Prior Publication Data
US 2023/0142018 A1 May 11, 2023

(30) Foreign Application Priority Data
May 22, 2020 (JP) .................. 2020-090048

(51) Int. Cl.
*F16H 37/12* (2006.01)
*B25J 17/00* (2006.01)

(52) U.S. Cl.
CPC ............ *F16H 37/122* (2013.01); *B25J 17/00* (2013.01)

(58) Field of Classification Search
CPC .......... F16H 37/122; B25J 17/00; B25J 9/102
See application file for complete search history.

(56) References Cited

U.S. PATENT DOCUMENTS 5,624,167 A * 4/1997 Katz ................... H01H 9/02
403/348
2009/0249918 A1* 10/2009 Koyama .............. B25J 15/0009
74/665 F (Continued)

FOREIGN PATENT DOCUMENTS

| CN | 104607982 A | 5/2015 |
| JP | S6110238 U | 1/1986 |
| JP | 6312394 A | 11/1994 |

(Continued)

OTHER PUBLICATIONS

English Abstract and Machine Translation for Japanese Publication No. 2019-111598 A, published Jul. 11, 2019, 22 pgs.

(Continued)

*Primary Examiner* — Terence Boes
(74) *Attorney, Agent, or Firm* — Fredrikson & Byron, P.A.

(57) ABSTRACT

This rotating shaft structure comprises a first link, a second link connected to the first link, and a plurality of speed reducers positioned between the first link and the second link. At least one of a speed-reducer-side attachment hole and a first-link-side attachment hole, which are for joining the speed reducers to the first link, is larger or longer than the other.

6 Claims, 12 Drawing Sheets

(56) References Cited

U.S. PATENT DOCUMENTS

2017/0095934 A1* 4/2017 Wang .................. B25J 17/0241
2017/0312924 A1* 11/2017 Kinoshita ............ B25J 15/0009

FOREIGN PATENT DOCUMENTS

| JP | 2012047027 A | 3/2012 |
|----|--------------|--------|
| JP | 2017196720 A | 11/2017 |
| JP | 2019111598 A | 7/2019 |
| KR | 101881350 B1 | 7/2018 |
| WO | 2007072546 A1 | 6/2007 |

OTHER PUBLICATIONS

English Abstract and Machine Translation for Japanese Publication No. 2017-196720 A, published Nov. 2, 2017, 25 pgs.
English Abstract and Machine Translation for Japanese Publication No. 2012-047027 A, published Mar. 8, 2012, 17 pgs.
English Abstract and Machine Translation for International Publication No. WO 2007072546 A1, published Jun. 28, 2007, 10 pgs.
English Abstract and Machine Translation for Chinese Publication No. 104607982 A, published May 13, 2015, 15 pgs.
English Abstract and Machine Translation for Korean Publication No. 101881350 B1, published Jul. 25, 2019, 19 pgs.
English Abstract and Machine Translation for Japanese Publication No. 06-312394 A, published Nov. 8, 1994, 9 pgs.
English Abstract and Machine Translation for Japanese Publication No. JPS6110238 U, published Jan. 21, 1986, 4 pgs.
PCT International Search Report dated Jul. 6, 2021 for related International PCT Application No. PCT/JP2021/018656, from which the instant application is based, 2 pgs.

* cited by examiner

ROTATING SHAFT STRUCTURE COMPRISING PLURALITY OF SPEED REDUCERS, AND MANUFACTURING METHOD THEREFOR

RELATED APPLICATIONS

This application is a 35 U.S.C. 371 national phase filing from International Application No. PCT/JP2021/018656, filed May 17, 2021, which claims priority to Japanese Application No. 2020-090048, filed May 22, 2020, the contents of which are incorporated herein by reference.

TECHNICAL FIELD

The present invention relates to a rotating shaft structure and a manufacturing method therefor, in particular, relates to a rotating shaft structure having a plurality of speed reducers and a manufacturing method therefor.

BACKGROUND ART

Generally, for rotating shafts of machines such as robots, construction machines, vehicles, and aircraft, a large (large capacity) speed reducer is used because the load applied to the speed reducer positioned between the links increases w % ben a load of 1 ton or more is applied. Since the large-capacity speed reducer has a large outer shape, the rotating shaft structure of the machine also becomes large. As a method for miniaturizing the rotating shaft structure, a structure has been proposed in which two small (small capacity) speed reducers are arranged so as to sandwich one link from both sides thereof, and each speed reducer is connected to the other link. (e.g., see Patent Literature 1 and 2). With such a structure, the rotating shaft structure can be miniaturized without using a large-capacity speed reducer.

Patent Literature 3 describes that, in a wrist mechanism of an industrial robot, a first speed reducer and a second speed reducer are arranged on both sides of an arm, pulleys are fixed to input shafts of the first and second speed reducers, respectively, and the pulleys are configured to be driven by two drive motors via a timing belt wound around the pulley.

Patent Literature 4 describes that, in a deceleration drive device, a collar having a flange portion is fixed to a motor housing by a bolt, a bearing for holding a rotating hub is arranged on the collar, a support member is attached to the flange portion by a bolt, a shim is positioned between the support member and the flange portion, so that an attachment gap of the bearing is adjusted by adjusting the shim. the parts and adjusting the shim.

CITATION LIST

Patent Literature

[PTL 1] WO 2007/072546 A1
[PTL 2] KR 10-1881350 A
[PTL 3] JP 1994 (H06)-312394 A
[PTL 4] JP 1986 (S61)-010238 U

SUMMARY OF INVENTION

Technical Problem

When assembling a rotating shaft structure including a plurality of speed reducers, it is necessary to previously adjust the positional relationship between a plurality of attachment holes on the speed reducer side and attachment holes on the link side. However, when a drive shaft common to multiple reducers is inserted while being rotated, an input shaft of the reducer will be rotated and the positional relationship between the attachment hole on the speed reducer side and the attachment hole on the link side may be shifted. As a result, there arises a problem that the rotating shaft structure cannot be easily assembled. Even when a separate drive shaft is inserted into each of the multiple reducers, the input shaft of the reducer may be rotated by inserting the drive shaft while rotating, whereby the positional relationship between the speed reducer side attachment hole and the link side attachment hole may be shifted.

Therefore, there is a demand for a technique for improving the manufacturing efficiency of a rotating shaft structure having a plurality of speed reducers.

Solution to Problem

One aspect of the present disclosure provides a rotating shaft structure comprising: a first link; a second link connected to the first link; and a plurality of speed reducers positioned between the first link and the second link, wherein one of a speed reducer side attachment hole and a first link side attachment hole configured to connect the speed reducer to the first link is larger than the other attachment hole or an elongate hole.

Another aspect of the present disclosure provides a manufacturing method of a rotating shaft structure comprising a first link, a second link connected to the first link, and a plurality of speed reducers positioned between the first link and the second link, the method comprising the steps of forming one of a speed reducer side attachment hole and a first link side attachment hole configured to connect the speed reducer to the first link so that the one attachment hole is larger than the other attachment hole or an elongate hole; previously adjusting the positional relationship between the speed reducer side attachment hole and the first link side attachment hole by attaching the plurality of speed reducers to the second link; attaching one of the speed reducers attached to the second link to the first link; inserting a drive shaft configured to drive the speed reducer into the speed reducer while rotating the drive shaft; and attaching the remaining speed reducer to the first link while a position of the speed reducer side attachment hole is displaced due to the insertion of the drive shaft.

Advantageous Effects of Invention

According to the aspect of the present disclosure, the speed reducer can be attached to the first link even when the position of the speed reducer side attachment hole is displaced due to the insertion of the drive shaft. As a result, it is possible to improve the manufacturing efficiency of the rotating shaft structure having the plurality of speed reducers.

DESCRIPTION OF EMBODIMENTS

Figure 1:
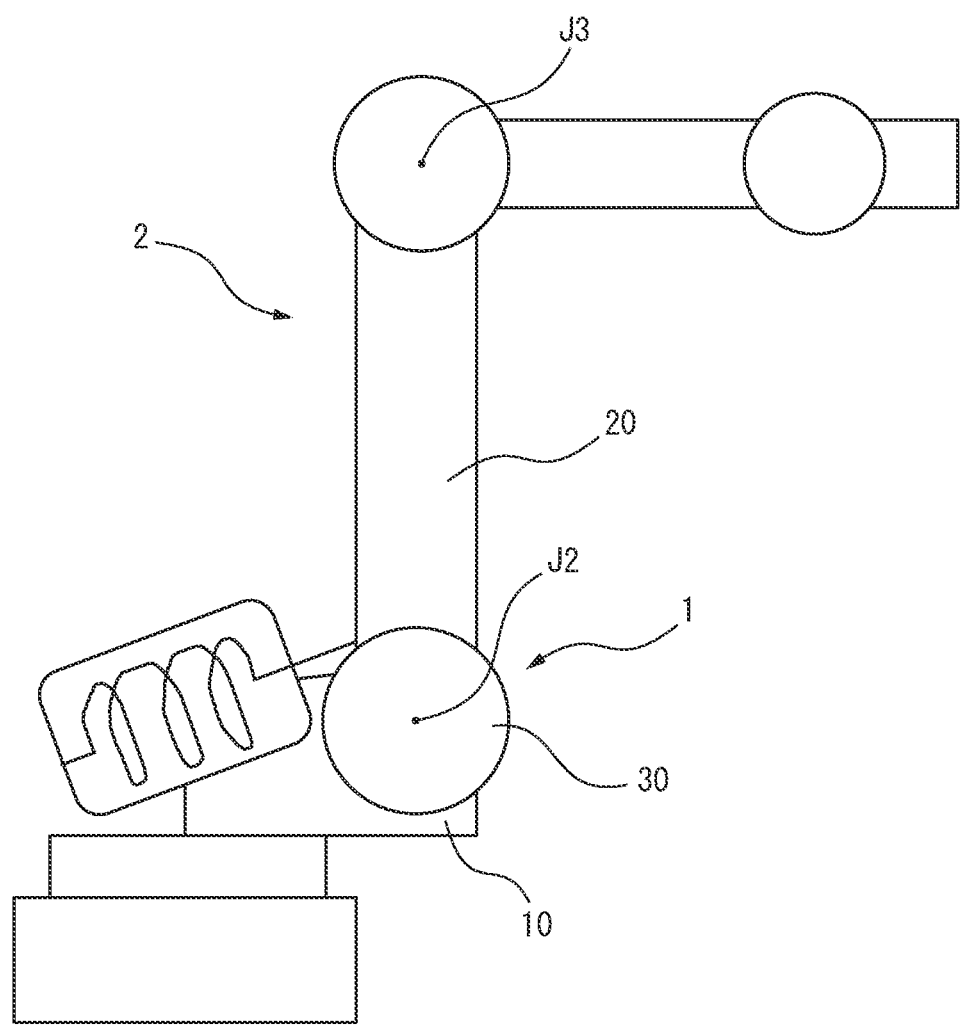
FIG. 1 is a side view showing an example of a machine having a rotating shaft structure.

The embodiments of the present disclosure will be described in detail below with reference to the attached drawings. In the drawings, identical or similar constituent elements have been assigned the same or similar reference signs. Furthermore, the embodiments described below do not limit the technical scope of the invention described in the claims or the definitions of the terms.

FIG. 1 shows an example of a machine 2 having a rotating shaft structure 1. The rotating shaft structure 1 is, for example, a joint structure of a robot, but may be a rotating shaft structure in another machine 2 such as a construction machine, a vehicle, or an aircraft. The rotating shaft structure 1 includes a first link 10, a second link 20 connected to the first link 10, and a plurality of speed reducers 30 positioned between the first link 10 and the second link 20. For example, the rotating shaft structure 1 is configured to rotate about a rotation axis J2 of the robot, the first link 10 is a rotation base configured to rotate about a vertical axis, and the second link 20 is a first arm configured to rotate about a horizontal axis. Alternatively, note that the first link 10 and the second link 20 may be opposite members, in which case the first link 10 may be the first arm and the second link 20 may be the rotation base, for example.

Figure 2A:
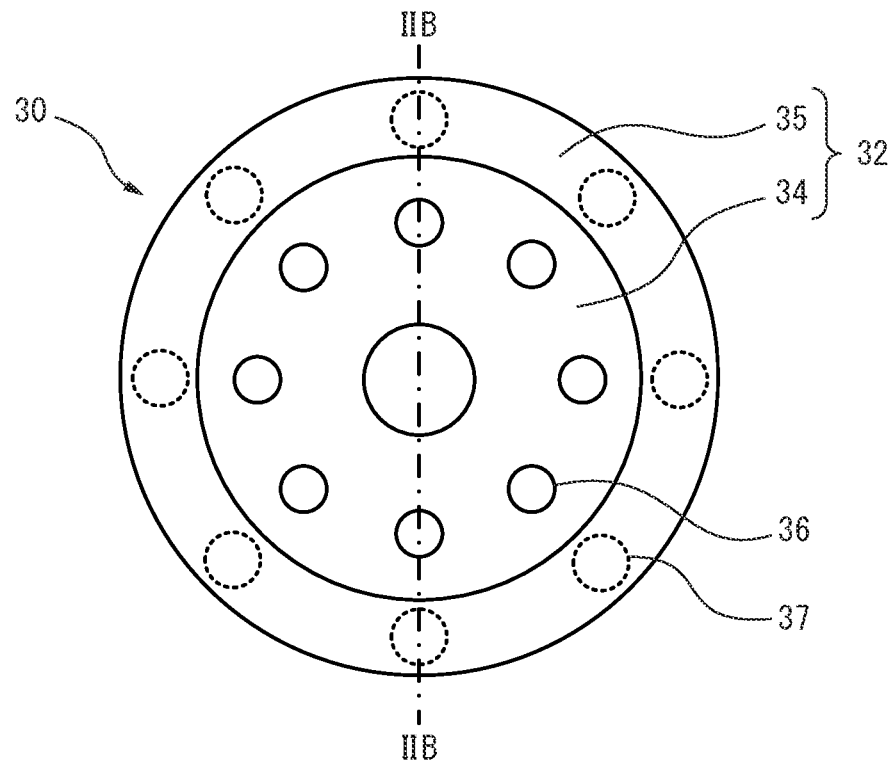
FIG. 2A is a plan view showing an example of a speed reducer.
Figure 2B:
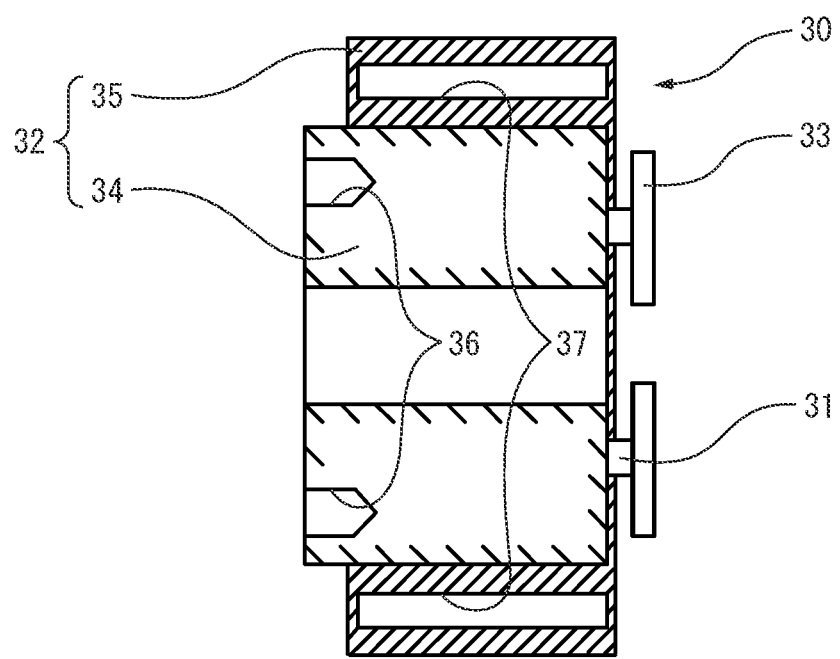
FIG. 2B is a cross-sectional view along a IIB-IIB line showing the example of the speed reducer.

FIGS. 2A and 2B show an example of the speed reducer 30. The speed reducer 30 includes an input shaft 31 and an output shaft 32. The input shaft 31 is attached with an input shaft side wheel 33 and inputs power via the input shaft side wheel 33. The input shaft side wheel 33 may be a gear configured to engage with a drive shaft side wheel described later, but may be a pulley or the like around which a belt, a cable, etc., is wound The output shaft 32 includes an inner output shaft 34 and an outer output shaft 35. For example, the inner output shaft 34 may be a shaft configured to rotate inward, and the outer output shaft 35 may be a case configured to rotate outward. When the inner output shaft 34 is fixed so as not to rotate, the power of the input shaft 31 is transmitted to the outer output shaft 35 and the outer output shaft 35 is rotated to output. When the outer output shaft 35 is fixed so as not to rotate, the power of the input shaft 31 is transmitted to the inner output shaft 34 and the inner output shaft 34 is rotated to output. In order to attach the inner output shaft 34 or the outer output shaft 35 to the first link 10 or the second link 20, the inner output shaft 34 or the outer output shaft 35 has one or more speed reducer side attachment hole 36 or 37, respectively, to which a screw such as a bolt can be fastened. For example, the speed reducer side attachment holes 36 and 37 may be arranged at predetermined intervals in the circumferential direction of the speed reducer 30.

Figure 3:
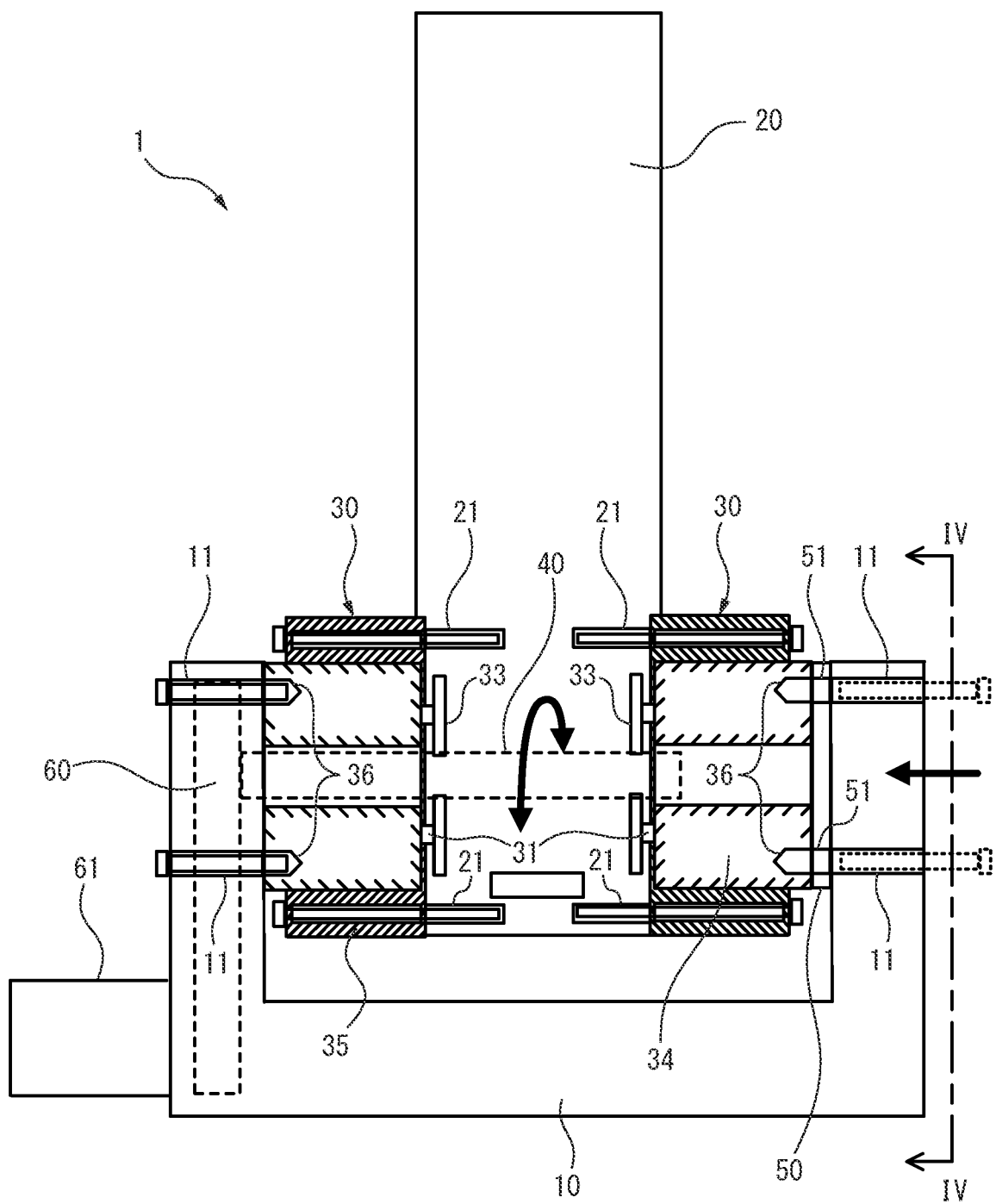
FIG. 3 is a cross-sectional view showing a part of the rotating shaft structure according to an embodiment.
Figure 4:
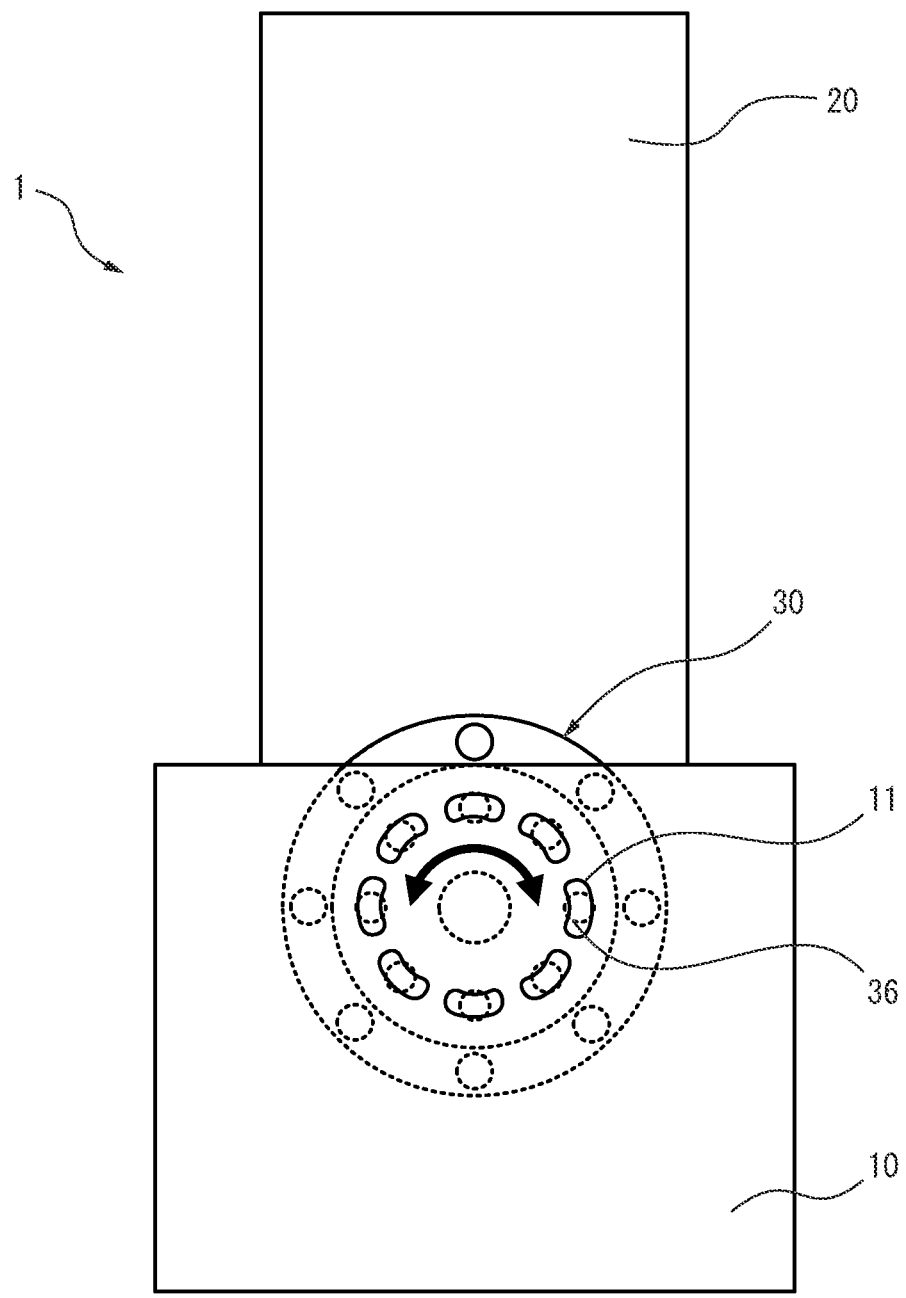
FIG. 4 is a side view along a IV-IV line showing the rotating shaft structure according to the embodiment.

FIGS. 3 and 4 show the rotating shaft structure 1 in the present embodiment. As shown in FIG. 3, the rotating shaft structure 1 has the first link 10, the second link 20 connected to the first link 10, and the plurality of speed reducers 30 positioned between the first link 10 and the second link 20. For example, the first link 10 may have a U-shaped portion, and the second link 20 may have an I-shaped portion. The first link 10 has a first link side attachment hole 11 for connecting the speed reducer 30 to the first link 10. The second link 20 has a second link side attachment hole 21 for connecting the speed reducer 30 to the second link 20. Although the plurality of speed reducers 30 are arranged on both sides of the second link 20, they may be arranged on one side of the second link 20. When the plurality of speed reducers 30 are arranged on one side of the second link 20, the first link 10 may have an L-shaped portion instead of the U-shaped portion. Further, two or more speed reducers 30 may be arranged on each of both sides of the second link 20, or three or more speed reducers 30 may be arranged on one side of the second link 20.

This rotating shaft structure 1 is a tandem drive type and further includes a drive shaft 40 common to the plurality of speed reducers 30, but may be another type in which the plurality of speed reducers 30 are driven by separate drive shafts. The drive shaft 40 has a drive shaft side wheel (not shown) linked to the input shaft side wheel 33 of the speed reducer 30. The drive shaft side wheel may be a gear configured to engage with the input shaft side wheel 33, but may be a pulley or the like around which a belt, a cable, etc., is wound. The drive shaft 40 is inserted into the plurality of speed reducers 30 to transmit a common driving force to the plurality of speed reducers 30. In this rotating shaft structure 1, the inner output shafts 34 of the plurality of speed reducers 30 are fixed to the first link 10, the outer output shafts 35 of the plurality of speed reducers 30 rotate, and the second link 20 rotates relative to the first link 10. For example, when the drive shaft 40 is inserted into the plurality of speed reducers 30 from the left side of FIG. 3 while being rotated, the input shaft 31 of the speed reducer 30 on the right side may be rotated, whereby the positional relationship between the speed reducer side attachment hole 36 and the first link side attachment hole 11 may be shifted. In order that the speed reducer 30 can be attached to the first link 10 even when the positional relationship between the speed reducer side attachment hole 36 and the first link side attachment hole 11 is deviated, it is preferable that the first link side attachment hole 11 be larger than the speed reducer side attachment hole 36 or an elongate hole as shown in FIG. 4, otherwise, the speed reducer side attachment hole 36 be larger than the first link side attachment hole 11 or an elongate hole. The location where these holes are formed into large or elongate holes may be only the place where the speed reducer 30 is finally fastened (in the example of FIG. 3, between the speed reducer 30 on the right side and the first link 10). Further, as shown in FIG. 4, it is preferable that the elongate hole be curved and extended in the circumferential direction of the speed reducer 30.

The manufacturing method of the rotating shaft structure 1 shown in FIG. 3 is, for example, as follows. It should be noted that FIG. 3 shows the following step 5.

(Step 1) One of the speed reducer side attachment hole 36 and the first link side attachment hole 11 for connecting the speed reducer 30 to the first link 10 is formed larger than the other or an elongate hole.

(Step 2) The two speed reducers 30 are attached to the second link 20, and the positional relationship between the speed reducer side attachment hole 36 and the first link side attachment hole 11 is previously adjusted.

(Step 3) One of the two speed reducers 30 attached to the second link 20 (the speed reducer 30 on the left side in the example of FIG. 3) is attached to the first link 10.

(Step 4) The drive shaft 40 for driving the speed reducer 30 is inserted into the speed reducer 30 while rotating the drive shaft 40. The drive shaft 40 is common to the plurality of speed reducers 30, but may be a separate drive shaft.

(Step 5) The remaining speed reducer of the two speed reducers 30 (the speed reducer 30 on the right side in the example of FIG. 3) is attached to the first link 10, while the position of the speed reducer side attachment hole 36 is displaced due to the insertion of the drive shaft 40. In this regard, since one of the first link side attachment hole 11 and the speed reducer side attachment hole 36 is larger than the other or the elongate hole, the speed reducer 30 can be attached to the first link 10, even when the positional relationship between the speed reducer side attachment hole 36 and the first link side attachment hole 11 is shifted.

Since the axial dimensions of the speed reducer 30 may vary depending on individual differences, the gap between the first link 10, the second link 20 and the speed reducer 30 may be narrow, and thus the speed reducer 30 and the first link 10 may interfere with each other. For this reason, it is common to slightly increase the gap between the first link 10 and the second link 20. However, when the speed reducer 30 is forcibly attached to the first link 10 with the gap formed, an excessive tensile force may be generated in the axial direction of the speed reducer 30, resulting in early damage of the speed reducer 30. Therefore, it is preferable that the rotating shaft structure 1 further have a shim 50 configured to adjust the gap between the first link 10, the second link 20 and the speed reducer 30. The shim 50 may be a disk shape or an annular shape, and may be provided with an insertion hole 51 through which a screw such as a bolt is inserted. The insertion hole 51 may have a diameter through which a screw such as a bolt can be inserted, but may have a large diameter or an elongated hole such as the first link side attachment hole 11 or the speed reducer side attachment hole 36.

The shim 50 may be positioned at the place where the speed reducer 30 is finally fastened (between the speed reducer 30 on the right side and the first link 10 in the example of FIG. 3), whereas the shim 50 may be positioned between the speed reducer 30 and the second link 20. Alternatively, when the plurality of speed reducers 30 are provided on one side or both sides of the second link 20, the shims 50 may be positioned between the plurality of speed reducers 30. In the former case, shims 50 having different types of thicknesses may be prepared in advance, and then the shim 50 having the required thickness may be appropriately selected and positioned before the remaining speed reducer 30 is attached to the first link 10 (step 5). In the latter case, before manufacturing the rotating shaft structure 1, the thickness required for the shim 50 is previously checked to prepare a predetermined shim 50, and then the predetermined shim 50 may be positioned before the two speed reducers 30 are attached to the second link 20 (step 2).

Figure 5:
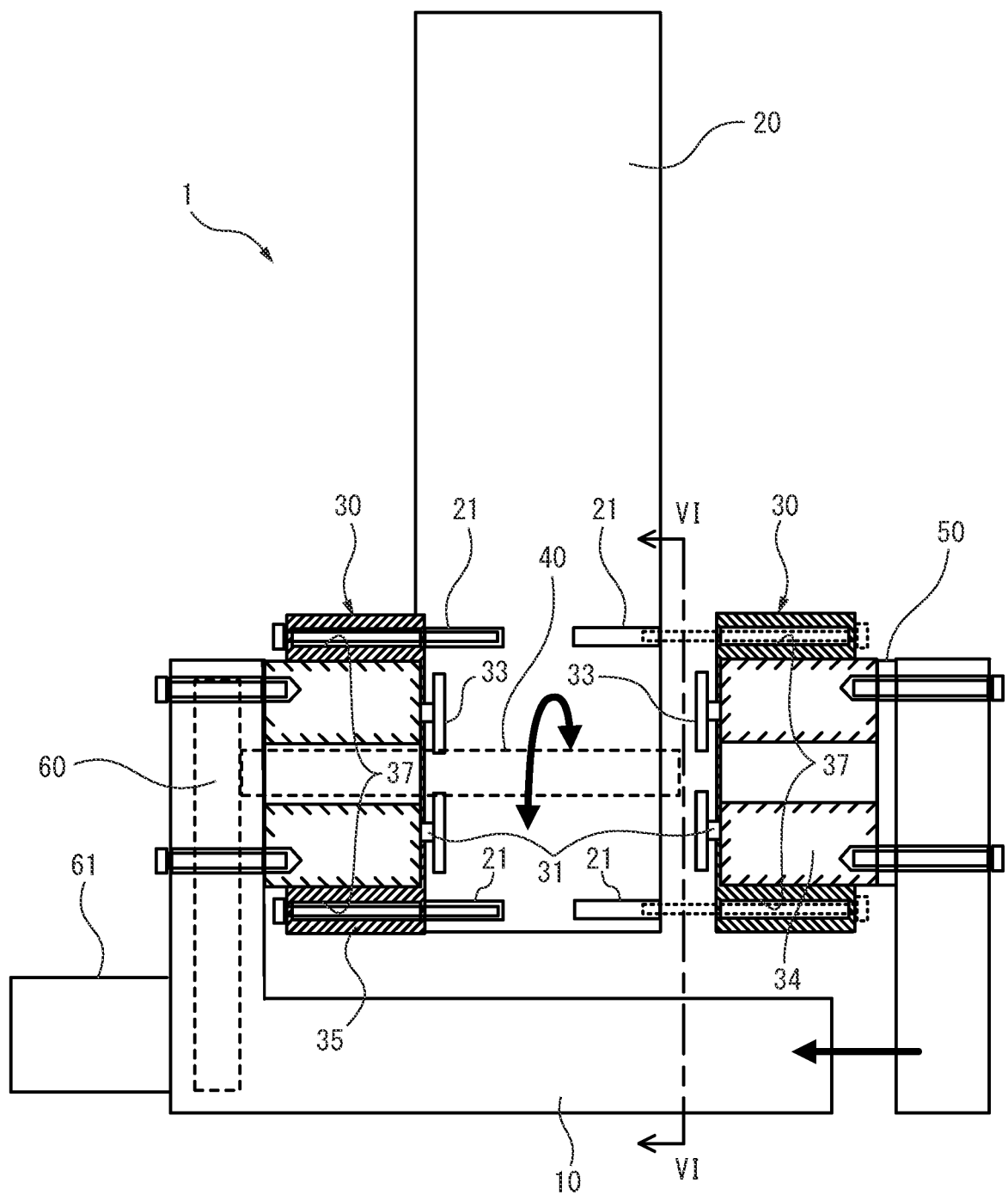
FIG. 5 is a cross-sectional view showing a part of a modification of the rotating shaft structure.
Figure 6:
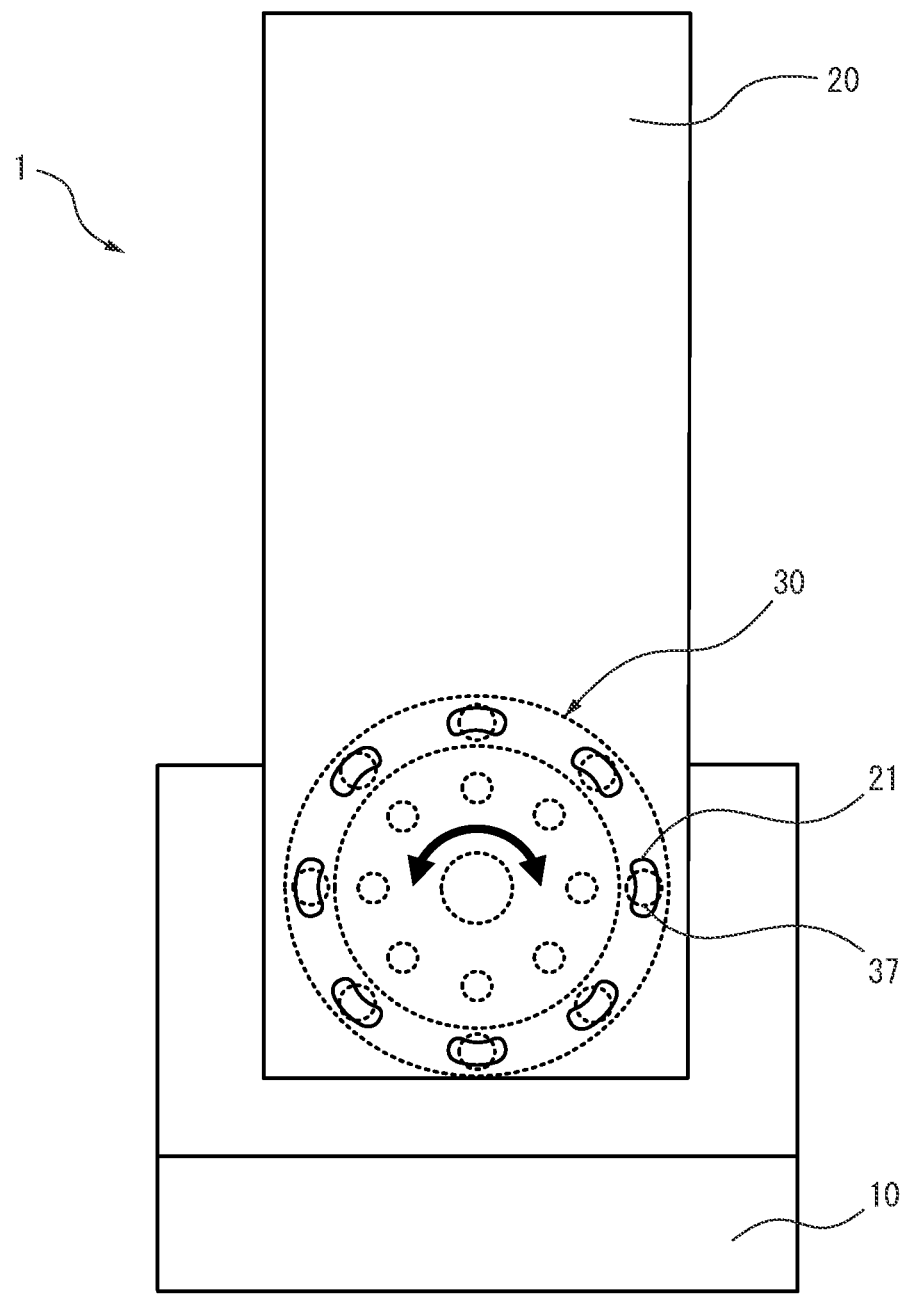
FIG. 6 is a side view along a VI-VI line showing the modification of the rotating shaft structure.

FIGS. 5 and 6 show a modification of the rotating shaft structure 1. This rotating shaft structure 1 is different from the above in that the speed reducer 30 is first attached to the first link 10 and then the second link 20 is attached. Further, this rotating shaft structure 1 is different from the above in that the first link 10 is configured to be separable into two portions so that the input shaft side wheel 33 of the speed reducer 30 does not interfere with the second link 20 when the second link 20 is attached. For example, in the example of FIG. 5, the two portions are an L-shaped portion and an I-shaped portion, but two L-shaped portions may be used. Further, in this rotating shaft structure 1, the place where the speed reducer 30 is finally fastened is between the second link 20 and the speed reducer 30 (the speed reducer 30 on the right side in the example of FIG. 5). Therefore, it is preferable that the second link side attachment hole 21 be larger than the speed reducer side attachment hole 37 or an elongate hole as shown in FIG. 6, or the speed reducer side attachment hole 37 be larger than the second link side attachment hole 21 or an elongate hole.

The manufacturing method of the rotating shaft structure 1 shown in FIG. 5 is, for example, as follows. It should be noted that FIG. 5 shows the following step 3-1.

(Step 0) The first link 10 is formed so that it can be separated into two portions.

(Step 1) One of the speed reducer side attachment hole 37 and the second link side attachment hole 21 for connecting the speed reducer 30 to the second link 20 is formed larger than the other or an elongate hole.

(Step 2) The two speed reducers 30 are attached to the first link 10, and the positional relationship between the speed reducer side attachment hole 37 and the second link side attachment hole 21 is previously adjusted.

(Step 3) One of the two speed reducers 30 attached to the first link 10 (the speed reducer 30 on the left side in the example of FIG. 5) is attached to the second link 20.

(Step 3-1) The two portions of the first link 10 are contacted to each other. This step may be performed after the step of inserting the drive shaft 40 into the speed reducer 30 (step 4). In this case, the two portions of the first link 10 are contacted to each other during the drive shaft 40 is rotated.

(Step 4) The drive shaft 40 for driving the speed reducer 30 is inserted into the speed reducer 30 while rotating the drive shaft 40. The drive shaft 40 is common to the plurality of speed reducers 30, but may be a separate drive shaft.

(Step 5) The remaining speed reducer of the two speed reducers 30 (the speed reducer 30 on the right side in the example of FIG. 5) is attached to the second link 20, while the position of the speed reducer side attachment hole 37 is displaced due to the insertion of the drive shaft 40. In this regard, since one of the speed reducer side attachment hole 37 and the second link side attachment hole 21 is larger than the other or the elongate hole, the speed reducer 30 can be attached to the second link 20, even when the positional relationship between the speed reducer side attachment hole 37 and the second link side attachment hole 21 is shifted.

In the rotating shaft structure as shown in FIG. 5, before manufacturing the rotating shaft structure 1, the thickness required for the shim 50 is previously checked to prepare a predetermined shim 50, and then the predetermined shim 50 may be positioned before the two speed reducers 30 are attached to the first link 10 (step 2). Alternatively, when the shim 50 is positioned between the second link 20 and the speed reducer 30 (the speed reducer 30 on the right side in the example of FIG. 5), shims 50 having different types of thicknesses may be prepared in advance, and then the shim 50 having the required thickness may be appropriately selected and positioned before the remaining speed reducer 30 is attached to the second link 20 (step 5).

Figure 7:
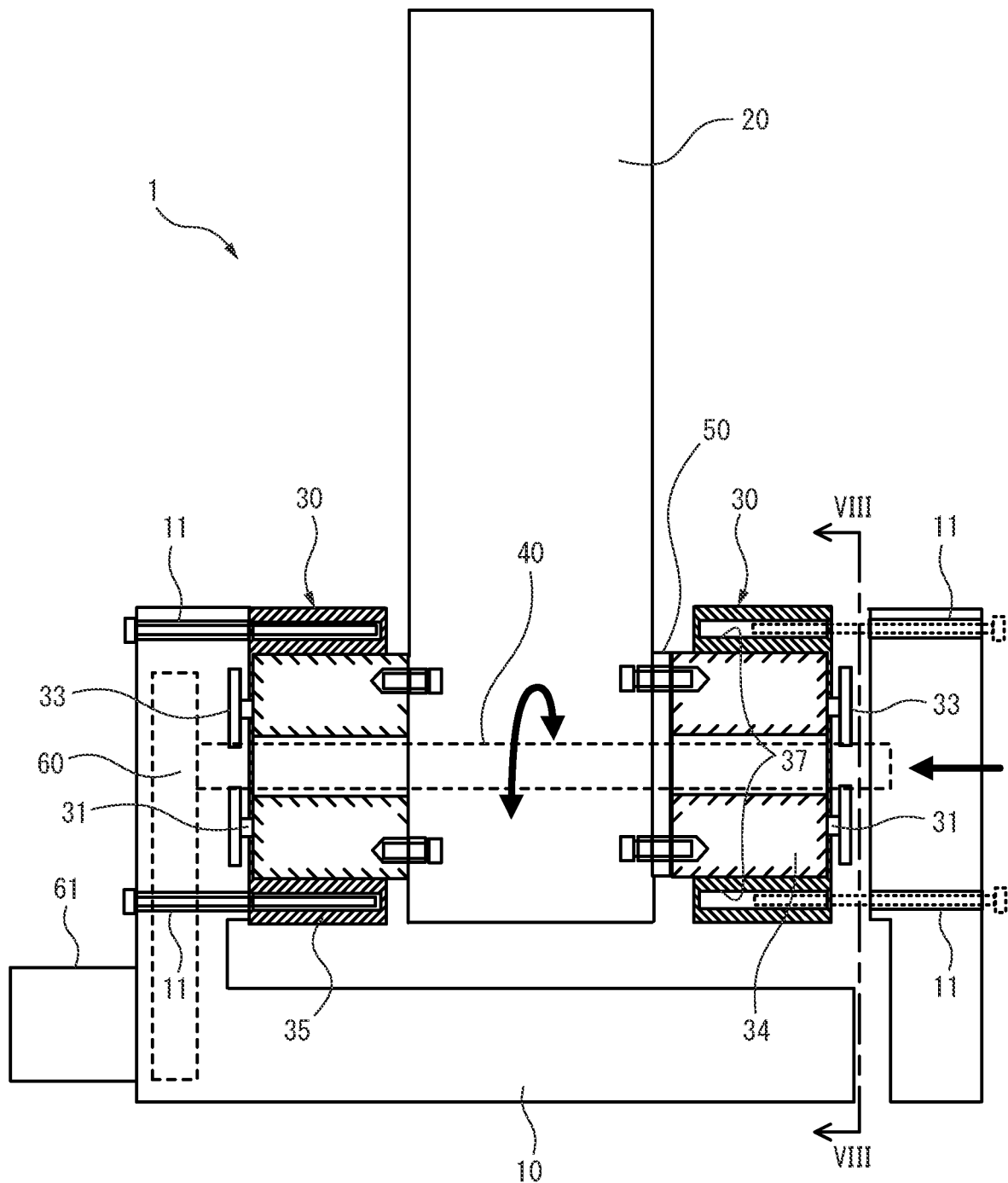
FIG. 7 is a cross-sectional view showing a part of another modification of the rotating shaft structure.
Figure 8:
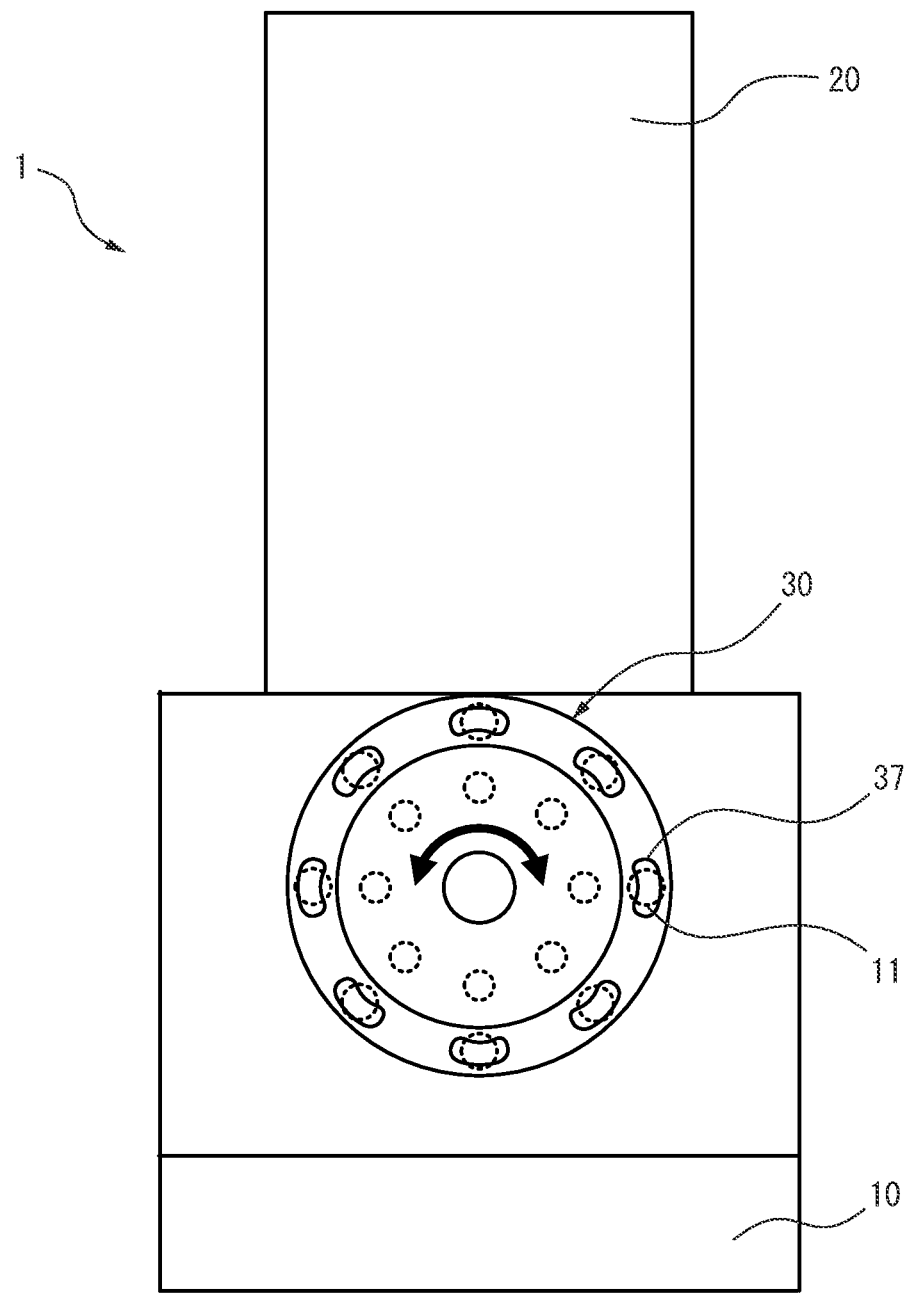
FIG. 8 is a side view along a VIII-VIII line showing the other modification of the rotating shaft structure.

FIGS. 7 and 8 show another modification of the rotating shaft structure 1. This rotating shaft structure 1 is different from the above in that the outer output shaft 35 of the speed reducer 30 is fixed to the first link 10, and the inner output shaft 34 is rotated. Further, in this rotating shaft structure 1, since the speed reducer 30 is attached to the second link 20 in advance, the first link 10 is configured to be separable into two portions so that the input shaft side wheel 33 of the speed reducer 30 does not interfere with the first link 10. Further, in this rotating shaft structure 1, the place where the speed reducer 30 is finally fastened is between the first link 10 and the speed reducer 30 (the speed reducer 30 on the right side in the example of FIG. 7). Therefore, it is preferable that the speed reducer side attachment hole 37 be larger than the first link side attachment hole 11 or an elongate hole as shown in FIG. 8, or the first link side attachment hole 11 be larger than the speed reducer side attachment hole 37 or an elongate hole.

The manufacturing method of the rotating shaft structure 1 shown in FIG. 7 is, for example, as follows. It should be noted that FIG. 7 shows the following step 3-1.

(Step 0) The first link 10 is formed so that it can be separated into two portions. Although the two portions are the L-shaped portion and the I-shaped portion in the example of FIG. 7, two L-shaped portions may be used.

(Step 1) One of the speed reducer side attachment hole 37 and the first link side attachment hole 11 for connecting the speed reducer 30 to the first link 10 is formed larger than the other or an elongate hole.

(Step 2) The two speed reducers 30 are attached to the second link 20, and the positional relationship between the speed reducer side attachment hole 37 and the first link side attachment hole 11 is previously adjusted.

(Step 3) One of the two speed reducers 30 attached to the second link 20 (the speed reducer 30 on the left side in the example of FIG. 7) is attached to the first link 10.

(Step 3-1) The two portions of the first link 10 are contacted to each other. This step may be performed after the step of inserting the drive shaft 40 into the speed reducer 30 (step 4). In this case, the two portions of the first link 10 are contacted to each other during the drive shaft 40 is rotated.

(Step 4) The drive shaft 40 for driving the speed reducer 30 is inserted into the speed reducer 30 while rotating the drive shaft 40. The drive shaft 40 is common to the plurality of speed reducers 30, but may be a separate drive shaft.

(Step 5) The remaining speed reducer of the two speed reducers 30 (the speed reducer 30 on the right side in the example of FIG. 7) is attached to the first link 10, while the position of the speed reducer side attachment hole 37 is displaced due to the insertion of the drive shaft 40. In this regard, since one of the speed reducer side attachment hole 37 and the first link side attachment hole 11 is larger than the other or the elongate hole, the speed reducer 30 can be attached to the first link 10, even when the positional relationship between the speed reducer side attachment hole 37 and the first link side attachment hole 11 is shifted.

In the rotating shaft structure as shown in FIG. 7, before manufacturing the rotating shaft structure 1, the thickness required for the shim 50 is previously checked to prepare a predetermined shim 50, and then the predetermined shim 50 may be positioned before the two speed reducers 30 are attached to the second link 20 (step 2). Alternatively, when the shim 50 is positioned between the first link 10 and the speed reducer 30 (the speed reducer 30 on the right side in the example of FIG. 7), shims 50 having different types of thicknesses may be prepared in advance, and then the shim 50 having the required thickness may be appropriately selected and positioned before the remaining speed reducer 30 is attached to the first link 10 (step 5).

Figure 9:
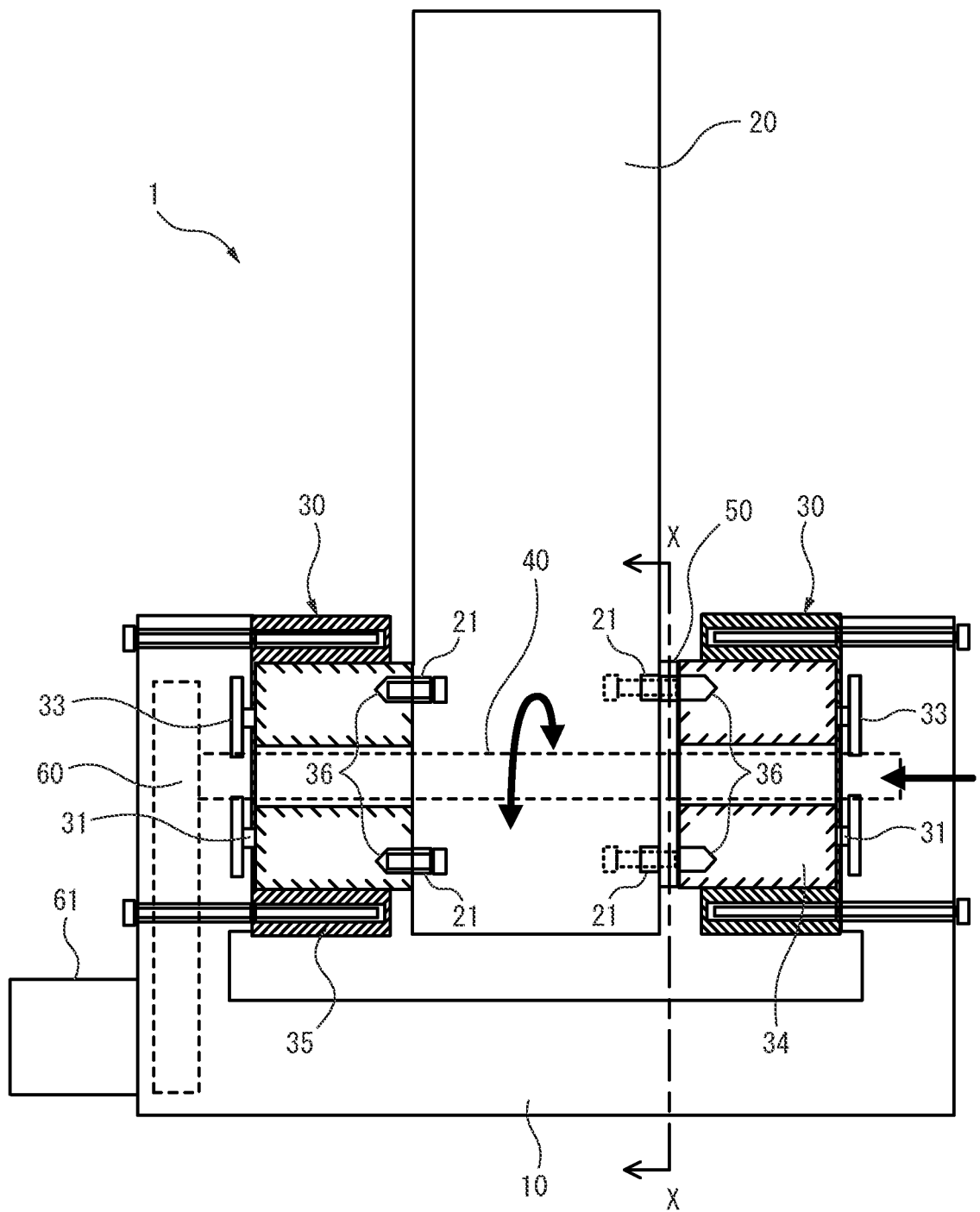
FIG. 9 is a cross-sectional view showing a part of a further modification of the rotating shaft structure.
Figure 10:
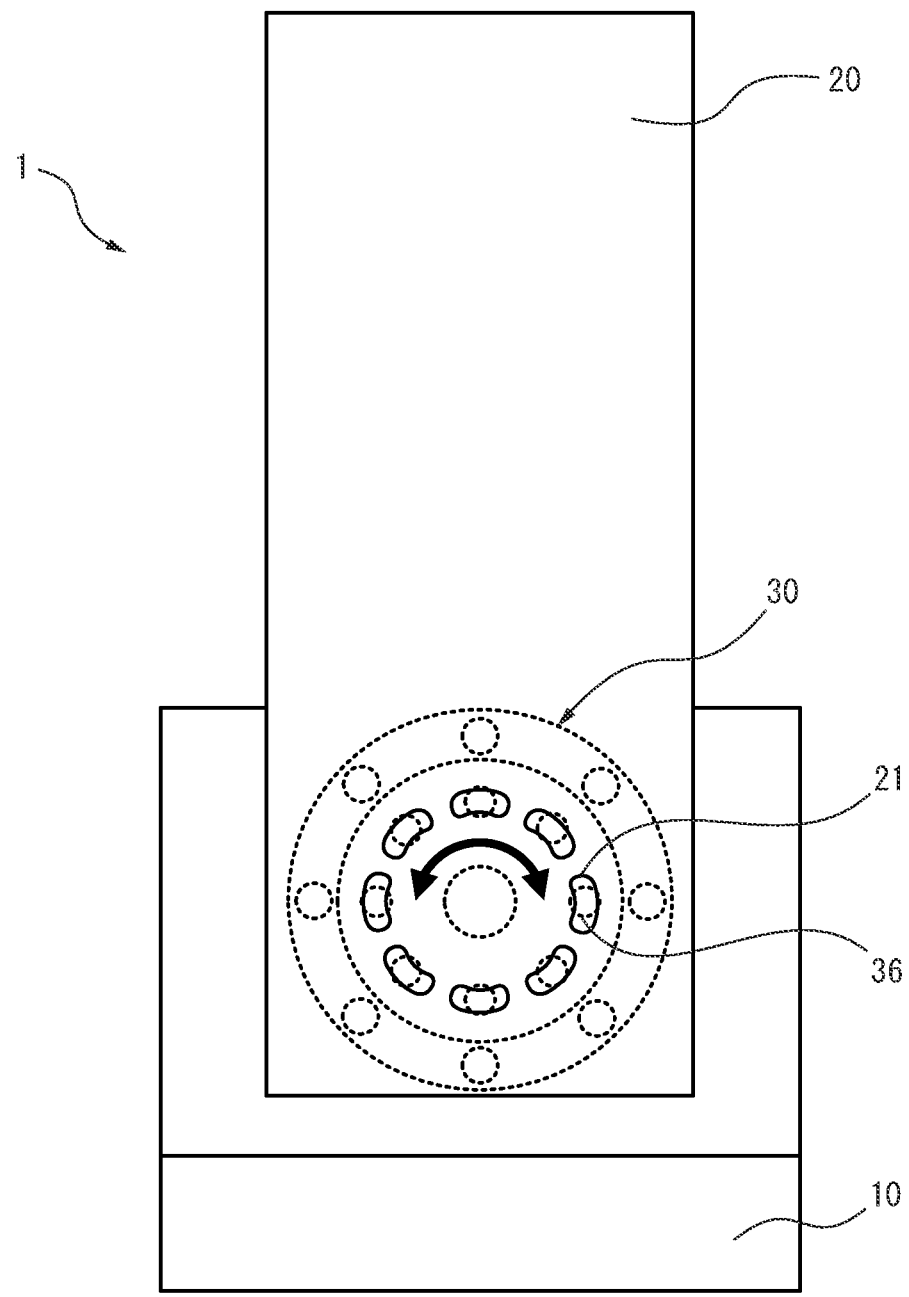
FIG. 10 is a side view along a X-X line showing the further modification of the rotating shaft structure.

FIGS. 9 and 10 show a further modification of the rotating shaft structure 1. In this rotating shaft structure 1, the outer output shaft 35 of the speed reducer 30 is fixed to the first link 10, and the inner output shaft 34 of the speed reducer 30 is rotated. Further, in this rotating shaft structure 1, the speed reducer 30 is attached to the first link 10 in advance, and then the second link 20 is attached, while the input shaft side wheel 33 of the speed reducer 30 does not interfere with the second link 20 when the second link 20 is attached. Therefore, this rotating shaft structure 1 is different from the above also in that the first link 10 is not configured to be separable into two portions. Further, in this rotating shaft structure 1, the place where the speed reducer 30 is finally fastened is between the second link 20 and the speed reducer 30 (the speed reducer 30 on the right side in the example of FIG. 9). Therefore, it is preferable that the second link side attachment hole 21 be larger than the speed reducer side attachment hole 36 or an elongate hole as shown in FIG. 10, or the speed reducer side attachment hole 36 be larger than the second link side attachment hole 21 or an elongate hole.

The manufacturing method of the rotating shaft structure 1 shown in FIG. 9 is, for example, as follows. It should be noted that FIG. 9 shows the following step 5.

(Step 1) One of the speed reducer side attachment hole 36 and the second link side attachment hole 21 for connecting the speed reducer 30 to the second link 20 is formed larger than the other or an elongate hole.

(Step 2) The two speed reducers 30 are attached to the first link 10, and the positional relationship between the speed reducer side attachment hole 36 and the second link side attachment hole 21 is previously adjusted.

(Step 3) One of the two speed reducers 30 attached to the first link 10 (the speed reducer 30 on the left side in the example of FIG. 9) is attached to the second link 20.

(Step 4) The drive shaft 40 for driving the speed reducer 30 is inserted into the speed reducer 30 while rotating the drive shaft 40. The drive shaft 40 is common to the plurality of speed reducers 30, but may be a separate drive shaft.

(Step 5) The remaining speed reducer of the two speed reducers 30 (the speed reducer 30 on the right side in the example of FIG. 9) is attached to the second link 20, while the position of the speed reducer side attachment hole 36 is displaced due to the insertion of the drive shaft 40. In this regard, since one of the speed reducer side attachment hole 36 and the second link side attachment hole 21 is larger than the other or the elongate hole, the speed reducer 30 can be attached to the second link 20, even when the positional relationship between the speed reducer side attachment hole 36 and the second link side attachment hole 21 is shifted.

In the rotating shaft structure as shown in FIG. 9, shims 50 having different types of thicknesses may be prepared in advance, and then the shim 50 having the required thickness may be appropriately selected and positioned before the remaining speed reducer 30 is attached to the second link 20 (step 5). Alternatively, before manufacturing the rotating shaft structure 1, the thickness required for the shim 50 is previously checked to prepare a predetermined shim 50, and then the predetermined shim 50 may be positioned before the two speed reducers 30 are attached to the first link 10 (step 2).

Figure 11:
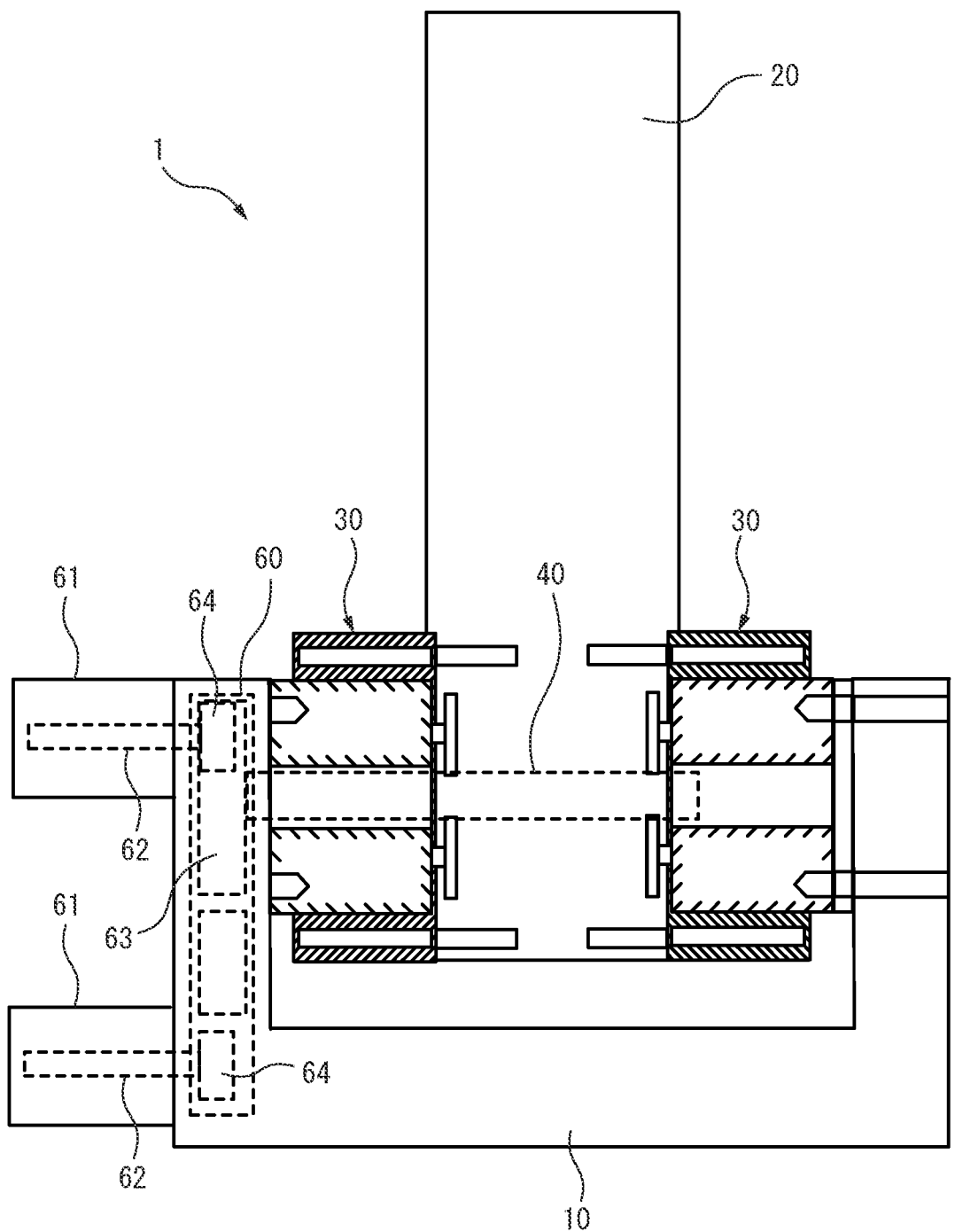
FIG. 11 is a cross-sectional view showing a part of a still further modification of the rotating shaft structure.

FIG. 11 shows a still further modification of the rotating shaft structure 1. The rotating shaft structure 1 further includes a deceleration mechanism 60 configured to transmit power to the drive shaft 40, and a drive source 61 configured to supply power to the deceleration mechanism 60. For example, the deceleration mechanism 60 may have a large wheel 63 and a small wheel 64. The large wheel and the small wheel 64 may be gears configured to engage with each other, whereas the wheels may be pulleys or the like around which a belt or cable, etc., is wound. The large wheel 63 is attached to the drive shaft 40, and the small wheel 64 is attached to a rotating shaft 62 of the drive source 61. The deceleration mechanism 60 may be arranged within the first link 10. By providing the deceleration mechanism 60, the drive source 61 can be further miniaturized and reduced in power, and the rotating shaft structure 1 can be further miniaturized.

Although the rotating shaft 62 of the drive source 61 is positioned parallel to the drive shaft 40, the rotating shaft 62 may be orthogonal to the drive shaft 40 by using a bevel gear, etc. Further, a plurality of the drive source 61 may be arranged in the first link 10, and each drive source 61 may supply power to the deceleration mechanism 60. By virtue of this, the output from the drive source 61 can be further increased or the drive source 61 can be further miniaturized.

Figure 12:
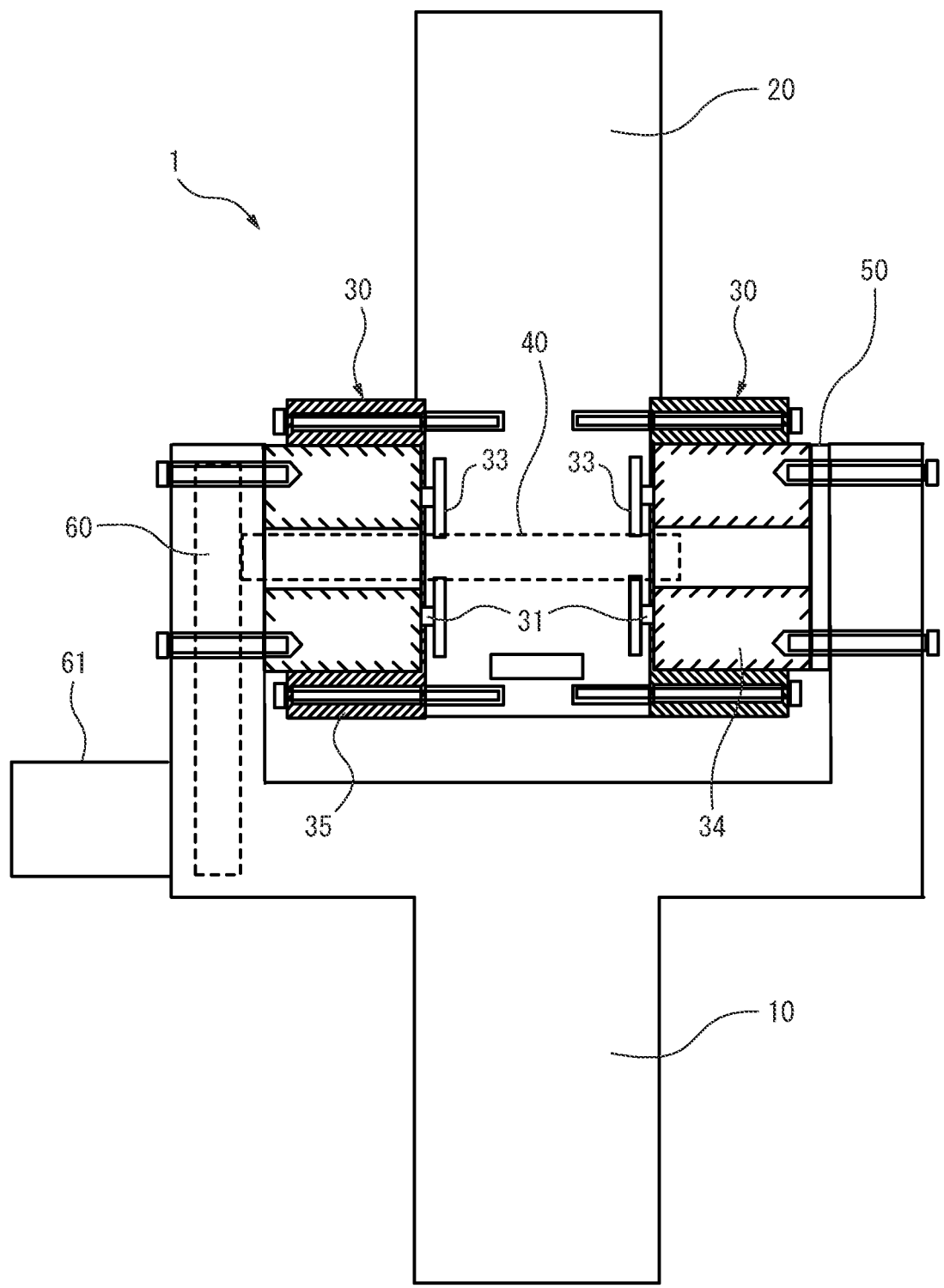
FIG. 12 is a cross-sectional view showing an example of the rotating shaft structure applied to another joint shaft.

FIG. 12 shows an example of the rotating shaft structure 1 applied to another joint structure. For example, the rotating shaft structure 1 may be applied to a rotating shaft structure configured to rotate about a rotation axis J3 (see FIG. 1) of the robot. In this case, the first link 10 is a first arm configured to rotate about a horizontal axis, and the second link 20 is a second arm configured to rotate about a horizontal axis. As described above, the rotating shaft structure 1 is not limited to the joint structure of the robot. Note that the rotating shaft structure 1 can be applied to other rotating shaft structures such as a crank mechanism, a steering mechanism, a door opening/closing mechanism, a wiper mechanism, and a four-node link mechanism provided to other machines such as construction machines, vehicles and aircrafts.

According to the above embodiments, the speed reducer 30 can be attached to the first link 10 even when the positions of the speed reducer side attachment holes 36, 37 are displaced due to the insertion of the drive shaft 40. As a result, the manufacturing efficiency of the rotating shaft structure 1 having the plurality of speed reducers 30 can be improved.

Although the various embodiments are described herein, it should be noted that the present invention is not limited to the above embodiments, and various modifications can be performed within the scope of the claims.

REFERENCE SIGNS LIST

1 rotating shaft structure
2 machine
10 first link
11 first link side attachment hole
20 second link
21 second link side attachment hole
30 speed reducer
31 input shaft
32 output shaft
33 input shaft side wheel
34 inner output shaft
35 outer output shaft
36, 37 speed reducer side attachment hole
40 drive shaft
50 shim
51 insertion hole
60 deceleration mechanism
61 drive source
62 rotating shaft
63 large wheel
64 small wheel
J2, J3 rotation axis

The invention claimed is:

1. The rotating shaft structure comprising:
   a first link;
   a second link connected to the first link; and
   a plurality of speed reducers positioned between the first link and the second link,
   wherein one of a speed reducer side attachment hole and a first link side attachment hole configured to connect the speed reducer to the first link is larger than the other attachment hole or an elongate hole, further comprising a common drive shaft inserted in the plurality of speed reducers and configured to transmit drive power to the plurality of speed reducers, wherein a position of the speed reducer side attachment hole is displaced due to the insertion of the drive shaft further comprising a deceleration mechanism configured to transmit power to the drive shaft and a drive source configured to supply power to the deceleration mechanism, wherein a rotating shaft of the drive source is positioned parallel to the drive shaft.

2. The rotating shaft structure according to claim 1, wherein a plurality of the drive source is arranged, and each drive source supplies power to the deceleration mechanism.

3. A manufacturing method of a rotating shaft structure comprising a first link, a second link connected to the first link, and a plurality of speed reducers positioned between the first link and the second link, the method comprising the steps of
   forming one of a speed reducer side attachment hole and a first link side attachment hole configured to connect the speed reducer to the first link so that the one attachment hole is larger than the other attachment hole or an elongate hole;
   previously adjusting the positional relationship between the speed reducer side attachment hole and the first link side attachment hole by attaching the plurality of speed reducers to the second link;
   attaching one of the speed reducers attached to the second link to the first link;
   inserting a drive shaft configured to drive the speed reducer into the speed reducer while rotating the drive shaft; and
   attaching the remaining speed reducer to the first link while a position of the speed reducer side attachment hole is displaced due to the insertion of the drive shaft.

4. The manufacturing method according to claim 3, further comprising the steps of:
   providing a shim configured to adjust a gap between the first link, the second link and the speed reducer; and
   positioning the shim between the speed reducer and the first or second link, or between the plurality of speed reducers.

5. The manufacturing method according to claim 3, wherein the drive shaft is a common drive shaft to the plurality of speed reduces.

6. The manufacturing method according to claim 3, further comprising the steps of:
   forming the first link so that the first link can be separated into two portions; and
   contacting the two portions to each other before the step of inserting the drive shaft.

* * * * *